US010074289B2

(12) United States Patent
Dore (10) Patent No.: US 10,074,289 B2
(45) Date of Patent: Sep. 11, 2018

(54) INTERACTIVE AND EDUCATIONAL TOOLS

(71) Applicant: Carol Bonner Design LLC, Seattle, WA (US)

(72) Inventor: Carol Dore, Seattle, WA (US)

(73) Assignee: Carol Bonner Design LLC, Seattle, WA (US)

(*) Notice: Subject to any disclaimer, the term of this patent is extended or adjusted under 35 U.S.C. 154(b) by 204 days.

(21) Appl. No.: 15/051,576

(22) Filed: Feb. 23, 2016

(65) Prior Publication Data

US 2017/0004728 A1 Jan. 5, 2017

Related U.S. Application Data

(63) Continuation-in-part of application No. 14/755,281, filed on Jun. 30, 2015.

(51) Int. Cl.
G09B 19/00 (2006.01)

(52) U.S. Cl.
CPC .................. G09B 19/0023 (2013.01)

(58) Field of Classification Search
CPC .......... G09B 17/00; G09B 19/02; G09B 1/00; G09B 1/22; G09B 23/02; A63F 2009/0815; A63F 9/0811; A63F 2003/00277
USPC ......... 434/98, 101, 102, 104, 172–174, 198, 434/199, 205, 402, 404, 405
See application file for complete search history.

(56) References Cited

U.S. PATENT DOCUMENTS

| | | | |
|---|---|---|---|
| 259,920 A * | 6/1882 | Reiff ...................... | G09B 17/00 434/174 |
| 1,161,381 A * | 11/1915 | Duffy ...................... | G06G 1/02 235/67 |
| 1,587,928 A * | 6/1926 | Thompson .............. | G09B 19/02 434/198 |
| 1,671,758 A | 5/1928 | Appley | |
| 2,932,909 A | 4/1960 | Bosco | |
| 2,938,282 A | 5/1960 | Spielman | |
| 3,199,227 A | 8/1965 | King | |
| 3,200,517 A | 8/1965 | Amerigo | |
| 3,248,809 A | 5/1966 | Stifano | |
| 3,289,324 A | 12/1966 | Hyman | |
| 3,419,973 A | 1/1969 | Manotas et al. | |
| 3,762,071 A | 10/1973 | Coffman et al. | |
| 3,783,531 A | 1/1974 | Kattenhorn | |
| 4,313,727 A | 2/1982 | Hults | |
| 4,389,193 A * | 6/1983 | Phillips .................. | G09B 17/00 434/174 |
| 4,634,385 A | 1/1987 | Stemper | |

(Continued)

Primary Examiner — Jerry-Daryl Fletcher
(74) Attorney, Agent, or Firm — John W. Branch; Lowe Graham Jones PLLC (57) ABSTRACT

The present disclosure is directed to educational tools including a cover, a shaft, a plurality of pages, and an interactive section having rotating member. The rotating member has a rotating set of indicia at a plurality of radial positions. The rotating member is configured to selectively rotate about the shaft to a plurality of aligned positions where the rotating set of indicia and the fixed set of indicia align. The rotating set of indicia and the fixed set of indicia are selected to have educational significance when aligned in selected combinations. In some examples, the educational tool includes a pivoting member. Both the rotating member and the pivoting member may comprise transparent portions that have educational significance.

20 Claims, 10 Drawing Sheets

(56) References Cited

U.S. PATENT DOCUMENTS

| | | | |
|---|---|---|---|
| 4,643,680 | A | 2/1987 | Hill |
| D394,878 | S | 6/1998 | Perez |
| D395,675 | S | 6/1998 | Perez |
| 6,869,286 | B2 | 3/2005 | Furry |
| 7,354,070 | B2 | 4/2008 | Polick |
| D651,649 | S | 1/2012 | Washington |
| 8,459,999 | B2 | 6/2013 | Washington |

\* cited by examiner

INTERACTIVE AND EDUCATIONAL TOOLS

RELATED APPLICATION

This application is a continuation-in-part of co-pending U.S. application Ser. No. 14/755,281, filed on Jun. 30, 2015. The entire disclosure of the above identified patent application is incorporated herein by reference for all purposes.

BACKGROUND

The present disclosure relates generally to educational tools. In particular, educational tools introducing children to core educational concepts in fun, interactive ways are described.

Education is a central concern to parents, society, and to national prosperity. Early education is recognized as a highly important concept to build a strong foundation for later educational initiatives in the classroom and other sources. Core educational concepts that are important for children to be introduced to at a young age include basic concepts in mathematics, spelling, and color characteristics. Unfortunately, many children lack access to educational tools that can enable their educational development in these and other areas.

Known educational tools are not entirely satisfactory for the range of applications in which they are employed. For example, existing educational tools fail to provide a fun, interactive experience to children. Parents and educators alike recognize that interactive and fun activities are effective ways to maintain children's focus and interest. Maintaining a child's focus and interest is essential to conveying core educational concepts.

Studies show that cognitive development, memory function, and comprehension are increased when the reader has the opportunity to physically engage reading material and create a tactile experience. Many existing educational tools do not give children and parents sufficient opportunity to interact with the tool, which causes children to lose interest in the tool and can result in dismissal of the educational concepts involved. Physically manipulating and exploring items is inherent to children, and tools are needed that facilitate those natural physical instincts of children to hold their attention.

Existing educational tools also suffer from being too complicated in some contexts. For example, in addition to the decreased efficacy of such tools mentioned above, computerized educational tools are prone to being too complicated or too abstract to meet children's needs. Computerized tools may allow interaction with a mouse or touch screen, but such interaction is not as inherent to children as is manipulating and exploring physical items with an optimum number of interactive degrees of freedom. Further, many computerized educational tools are prohibitively expensive for children in economically disadvantaged communities.

A particular limitation of conventional educational tools is their failure to bridge gaps between abstract concepts and concrete realities more readily understood by children. For example, educational tools directed to colors are often limited to symbolic representations of words without providing depictions of real-word, relatable items to give context to the concepts involved. Educational tools attempting to teach children the color wheel often lack reinforcing, engaging, approachable subject matter that helps children see how colors interact and blend to form other colors.

Thus, there exists a need for educational tools that improve upon and advance the design of known educational tools. Examples of new and useful educational tools relevant to the needs existing in the field are discussed below.

SUMMARY

The present disclosure is directed to educational tools including a cover, a shaft, a plurality of pages, and an interactive section having rotating member. The rotating member has a rotating set of indicia at a plurality of radial positions. The rotating member is configured to selectively rotate about the shaft to a plurality of aligned positions where the rotating set of indicia and the fixed set of indicia align. The rotating set of indicia and the fixed set of indicia are selected to have educational significance when aligned in selected combinations. In some examples, the educational tool includes a pivoting member. Both the rotating member and the pivoting member may comprise transparent portions that have educational significance.

DETAILED DESCRIPTION

The disclosed educational tools will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various educational tools are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The educational tools described herein function to provide children, parents, and educators with fun, interactive ways to explore core educational concepts. The shortcomings of conventional educational tools are effectively addressed by the present educational tools described in detail below, including by educational tool 100 and educational tool 200 shown in the figures.

For example, educational tool 100 and educational tool 200 provide users with a variety of physical and social interaction options without providing so many options that the tool becomes offputtingly complex. Studies have shown the benefits of using non-digital educational tools including increased comprehension, retention, and cognitive development. Unlike computer and computer tablet based tools, educational tool 100 provides users with opportunities to interact with physical items rather than peripheral devices or touchscreens, which are steps removed from directly interacting with educational components.

Educational tool 100 and educational tool 200 further provide users with a variety of games, challenges, and activities to play. Educational tool 100 provides additional entertainment and appeal by converting from a configuration resembling a closed book to an open configuration with aspects reminiscent of a board game and other aspects reminiscent of a comic book.

Addressing limitations existing in the prior art, educational tool 100 provides a rotating member that children can manipulate to help encourage them to explore colors and learn how to combine colors to create new colors. Similarly, addressing limitations existing in the prior art, educational tool 200 provides a pivoting member that children can manipulate to help encourage them to explore colors and learn how to combine colors to create new colors. The physical interaction with selectable colors and related graphical depictions of common items of that color help reinforce connections between primary, secondary, and tertiary colors With reference to the figures, an example of an educational tool, educational tool 100, will be described in more detail. As can be seen, educational tool 100 includes a front cover 102, a rear cover 104, a plurality of pages 106 *a-i*, a peg 117, a shaft 114, a rotating member 115, and printed subject matter 108. Educational tool 100 meets the current English language standards for children ages 3 to 6 as established by the Common Core State Standards. The components of educational tool 100 will now be described in more detail.

Figure 1:
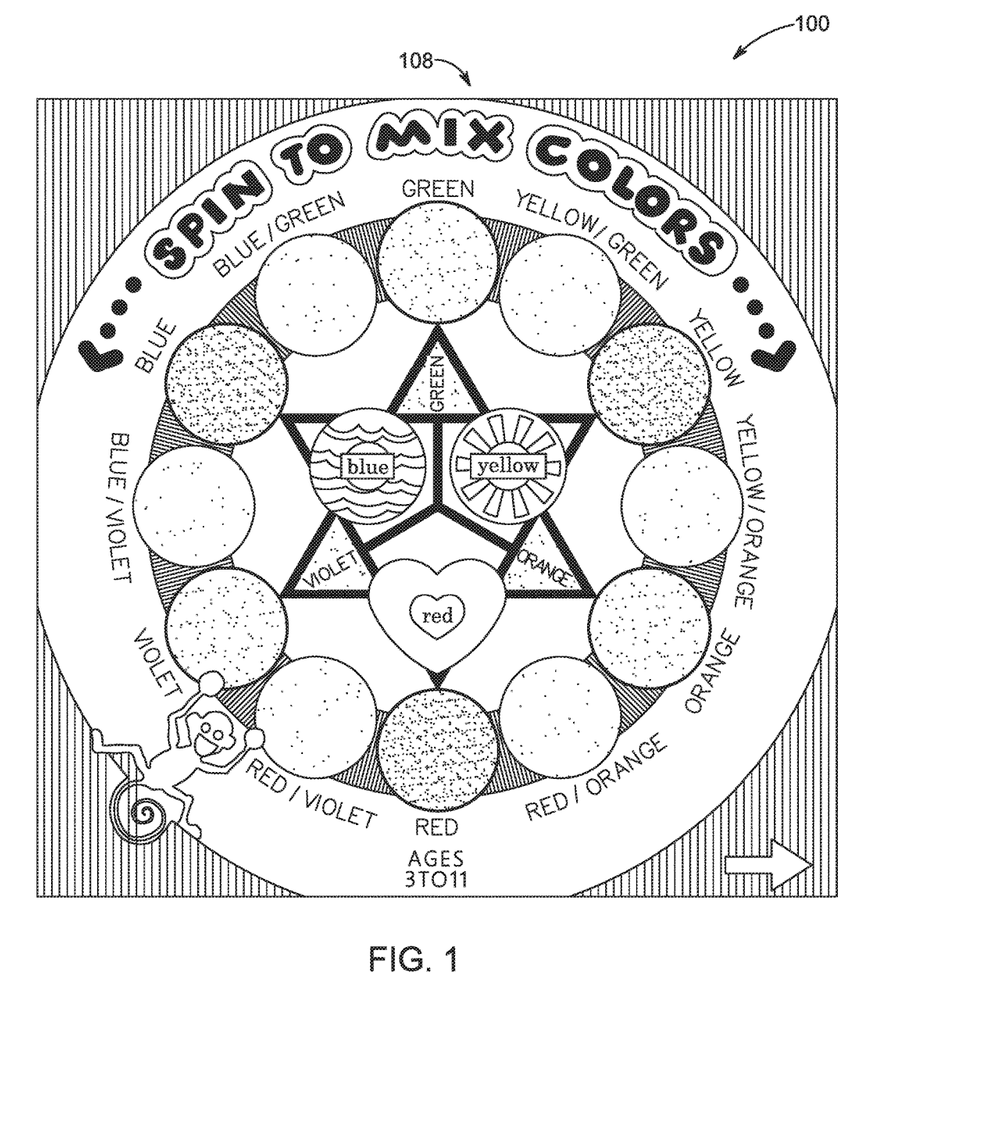
FIG. 1 is a perspective view of the cover of a first example of an educational tool focused on colors and color combinations.

Referring now to FIG. 1, front cover 102 functions to support the other components of educational tool 100. In the example shown in FIG. 1, front cover 102 includes printed subject matter 108, which comprises indicia that introduces the subject matter of educational tool 100 and educational tool 200 and identifies the color concepts explained in both.

In the present example, front cover 102 is formed from card stock paper, but any currently known or later developed substrate suitable for selectively adopting different configurations and for supporting components of the educational tool may be used. In a particular example, the cover is formed from heavy card stock with sufficient rigidity to enable the cover to stand upright. The cover may also be formed from plastic, metal, and composite materials to suit different applications and purposes. Finally, in the present embodiment, the components of educational tool 100 and educational tool 200 have substantially planar faces. In other embodiments, one or more of the sections have faces with non-planar topographies, such as to depict landscapes, human characters, animals, fanciful creatures, or buildings, etc. Further, in other embodiments, the components of educational tool 100 and educational tool 200 may further comprise additional indicia, such as letters, numbers, textures, smells, notes, sounds, or any other features having educational significance.

In the present embodiment, FIG. 1 introduces the child to the concept of primary, secondary, and tertiary colors. Thus, front cover 102 comprises printed subject matter 108 that comprises primary colors, secondary colors, and tertiary colors. In the present embodiment, printed subject matter 108 is configured to be congruent with the subsequent pages. Thus, in the embodiment shown in FIG. 1, printed subject matter 108 is arranged in a wheel-like configuration comprised of colored circles with a star shaped center indicia 110 in the center. As in the figures described below, the embodiment identified in front cover 102 depicts center indicia 110 comprising a blue circle featuring waves, a yellow circle featuring a sunburst, and a red heart, all of which are within identified sections of an equilateral triangle that is superimposed on a second equilateral triangle.

As in case of the subsequent figures, the configuration of printed subject matter 108 may comprise any shape or configuration so long as it represents each of the three primary colors, each of the three secondary of colors, and the tertiary colors that may be formed accordingly Further, printed subject matter 108 may be located anywhere on front cover 102 and in any configuration sufficient to act as a contrast and impart the lesson of the uniqueness of colors and color combinations. In the present figure, printed subject matter 108 comprises indicia identifying that the lesson contained on front cover 102 and the pages after it relate to primary, secondary, and tertiary colors. In this manner, center indicia 110 and printed subject matter 108 complement and reinforce the lesson for the child to understand the significance of, and become capable of identifying, tertiary colors by using the skills gained in the preceding lessons.

It should be understood that FIG. 1 depicts center indicia 110 and printed subject 108 matter in a particular configuration and arrangement by way of example only. As with the previous figures, the order, presentation, and format in which each of the colors appears on the page is not important so long as the necessary colors are included. In alternative embodiments (not shown), the pages may include features in addition, or alternatively, to indicia. Further, printed subject matter 108 may be located anywhere on front cover 102 and in any configuration sufficient to act as a contrast and impart the lesson of the uniqueness of tertiary colors. In alternative embodiments, not shown, front cover 102 may be duplicated and configured as page 106*e* and to further reinforce the educational significance of printed subject matter 108.

Figure 2:
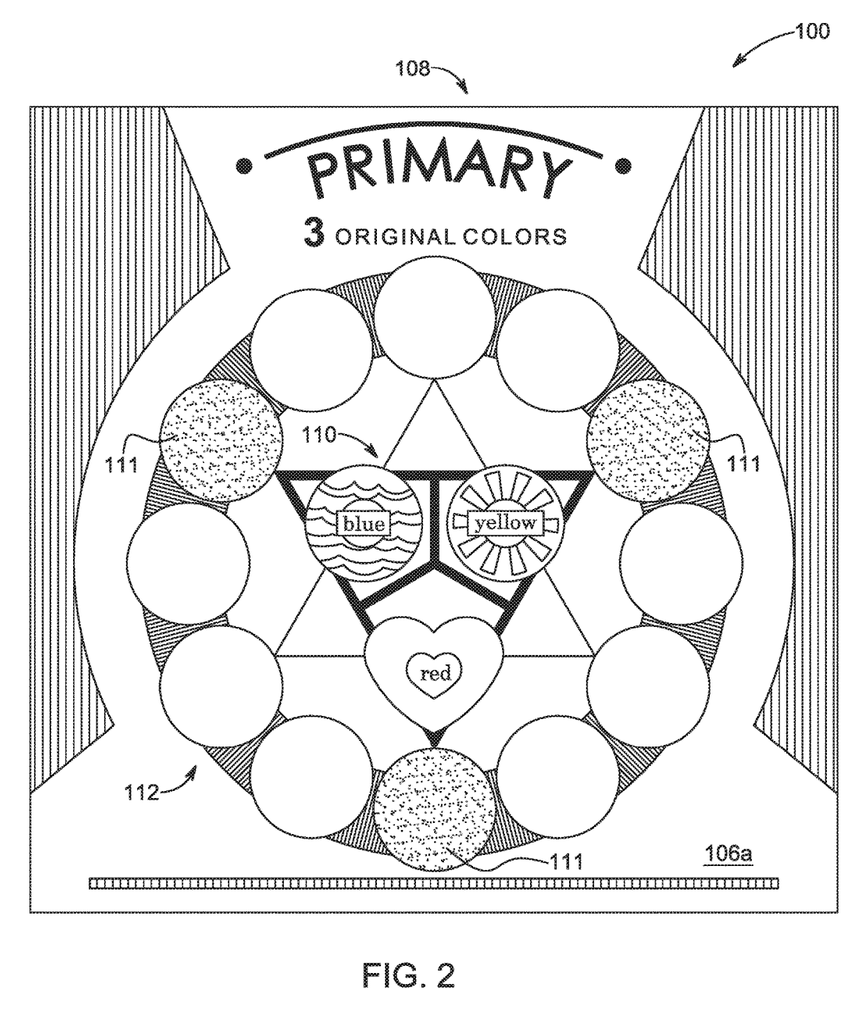
FIG. 2 is a perspective view of the educational tool shown in FIG. 1 depicting primary color indicia on a rotating member and primary color indicia on a page.

In the example shown in FIG. 2, page 106*a* of the plurality of pages 106 *a-i* is shown. As can be seen, first page 106*a* and further comprises printed subject matter 108, center indicia 110, and outer indicia 112. In the present figure, printed subject matter 108 comprises indicia identifying that the lesson contained on page 106a relates to primary colors and introduces the basics of primary colors to the child. Center indicia 110 and outer indicia 112 comprise indicia that identify the three primary colors, e.g., red, blue, and yellow. By way of example, then, in the embodiment identified in page 106a, center indicia 110 comprises a blue circle featuring waves, a yellow circle featuring a sunburst, and a red heart, all of which are within identified sections of an equilateral triangle that is superimposed on a second equilateral triangle.

In the present embodiment, outer indicia 112 comprises a ring of colorless circles superimposed on a contrasting circle border with at least three colored outer indicia 111 interspersed within the ring of colorless circles and adjacent to the same color component of center indicia 110 as shown. By way of example, the present figure depicts a colored outer indicia 111 that is colored blue and adjacent to the center indicia 110 that is blue; a colored outer indicia 111 that is colored yellow and adjacent to the center indicia 110 that is yellow; and a colored outer indicia 111 that is colored red and adjacent to the center indicia 110 that is colored red. Thus, center indicia 110 is configured to "point" to a corresponding colored outer indicia 111 within outer indicia 112 as shown. In this manner, center indicia 110 and outer indicia 112 complement and reinforce the lesson for the child to understand the significance of, and become capable of identifying, each of the three primary colors.

It should be understood that FIG. 2 depicts center indicia 110, colored outer indicia 111, and outer indicia 112 in a particular configuration and arrangement by way of example only. In the present embodiment, outer indicia 112 and colored outer indicia 111 are shown to be substantially circular, however, any shape or representation sufficient to impart the color lesson may be employed. Further the order, presentation, and format in which each of the primary colors appears on the page is not important so long as all three primary colors are included. In alternative embodiments (not shown), the pages may include features in addition, or alternatively, to the indicia. Further, printed subject matter 108 may be located anywhere on page 106a and in any configuration sufficient to act as a contrast and impart the lesson of the uniqueness of primary colors.

Figure 3:
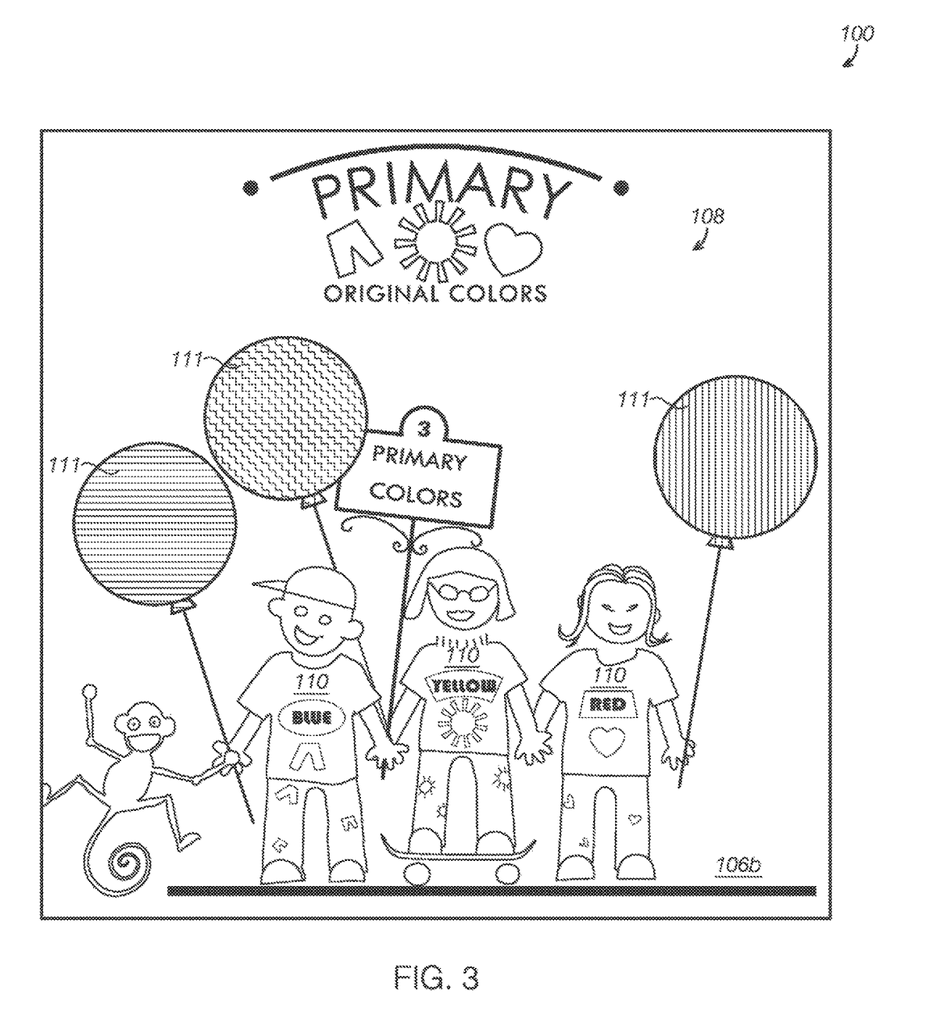
FIG. 3 is a perspective view of the educational tool shown in FIG. 1 depicting an alternative representation of primary color indicia on a page.

Referring now to FIG. 3, page 106b of the plurality of pages 106 is shown. As can be seen, page 106b comprises printed subject matter 108 that reiterates and reinforces the primary color concepts as depicted on page 106a. Thus, as shown in FIG. 3, page 106b depicts center indicia 110 comprising the colors blue, red, and yellow and appearing on the clothing of three children. Further, in this embodiment, page 106b depicts corresponding colored outer indicia 111 shaped like a balloon. Thus, to reinforce the lesson contained in page 106a, colored outer indicia 111 in the present figure comprises red balloon, a yellow balloon, and a blue balloon located over and substantially adjacent to center indicia 110 of the same color on the children's clothing as shown.

It should be understood that is an object of the present invention that center indicia 110 and colored outer indicia 111 comprise each of the three primary colors and that the actual shape and representation of center indicia 110 and colored outer indicia 111 is not important. That is, each may comprise any shape or configuration so long as it represents each of the three primary colors. It should be understood that FIG. 3 depicts center indicia 110 and colored outer indicia 111 in a particular configuration and arrangement by way of example only. Further, printed subject matter 108 may be located anywhere on second page 106b and in any configuration sufficient to act as a contrast and impart the lesson of the uniqueness of primary colors.

Shaft.

Shaft 114 serves to rotationally support rotating member 115. Shaft 114 is mounted on at least one of the plurality of pages 106 perpendicular to the surface of the page. Any currently known or later developed form of shaft, pivot, or bearing may be used to rotationally support a rotating member 115 (discussed in further detail below). The shaft or other rotational support member may be configured to provide continuous rotation or rotation to discrete radial positions.

Plurality of Pins.

Figure 5:
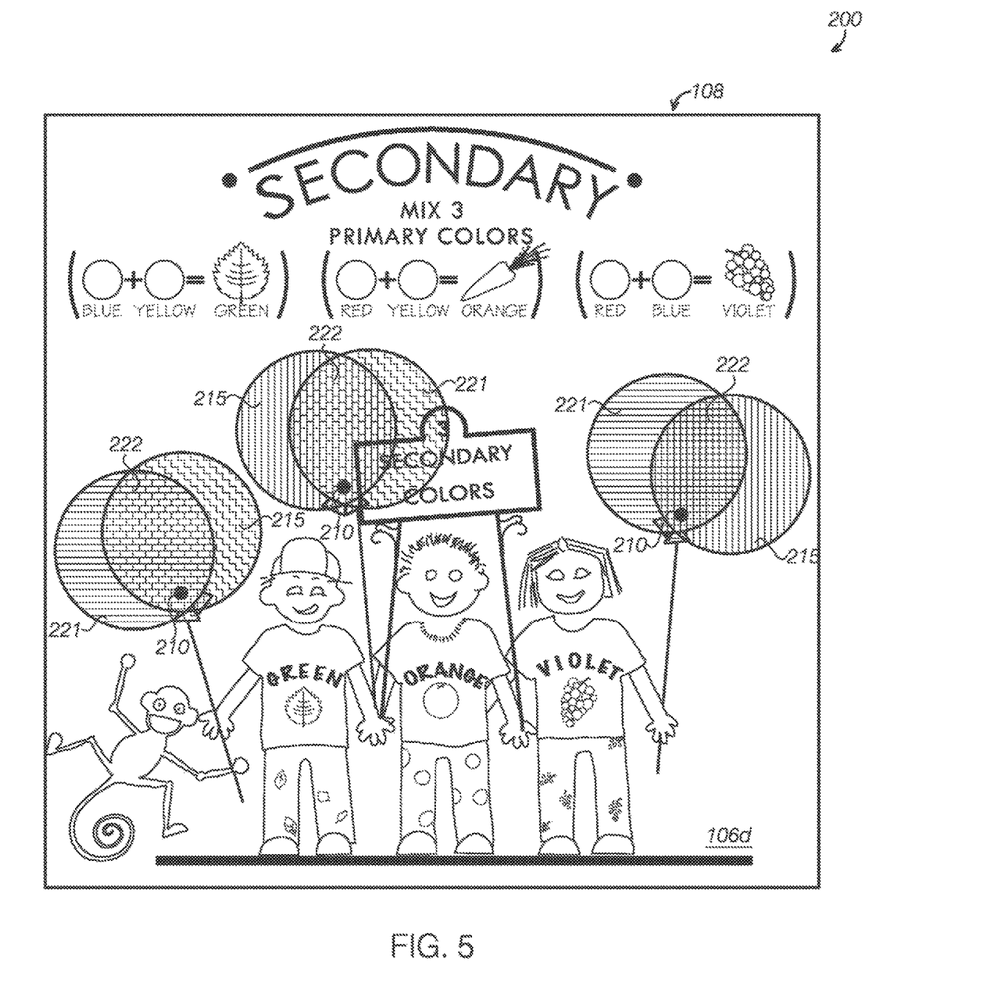
FIG. 5 is a perspective view of the educational tool shown in FIG. 1 depicting primary color indicia on a pivoting member and primary color indicia on a page where the pivoting colors form secondary colors when aligned with the indicia on the interaction section.

Plurality of pins 210 serves to rotationally support each of plurality of pivoting members 215 (discussed in further detail in FIG. 5). Each of said plurality of pins 210 is mounted on at least one of said plurality of pages 106 and perpendicular to the surface of the page. Any currently known or later developed form of shaft, pivot, or bearing may be used to pivotally support at least one of the said plurality of pivoting members 215. The shaft or other pivotal support member may be configured to provide continuous pivoting or pivoting to discrete radial positions.

Rotating Member.

Rotating member 115 provides an interactive component to educational tool 100. Rotating member 115 is rotationally mounted to shaft 114 and functions to rotate about shaft 114 to a plurality of continuous positions. The rotating capability of rotating member 115 enables children, parents, and educators to selectively align colors provided on rotating member 115 with colors provided on the plurality of pages 106. In the present example, rotating member 115 cooperates with shaft 114 to rotate substantially continuously about shaft 114; however, in other examples the rotating member cooperates with the shaft or other rotational support member to rotate to discrete radial positions. In some embodiments, rotating member 115 may comprise a plurality of pegs 116 to facilitate turning rotating member 115 about the axis of shaft 115.

Figure 4:
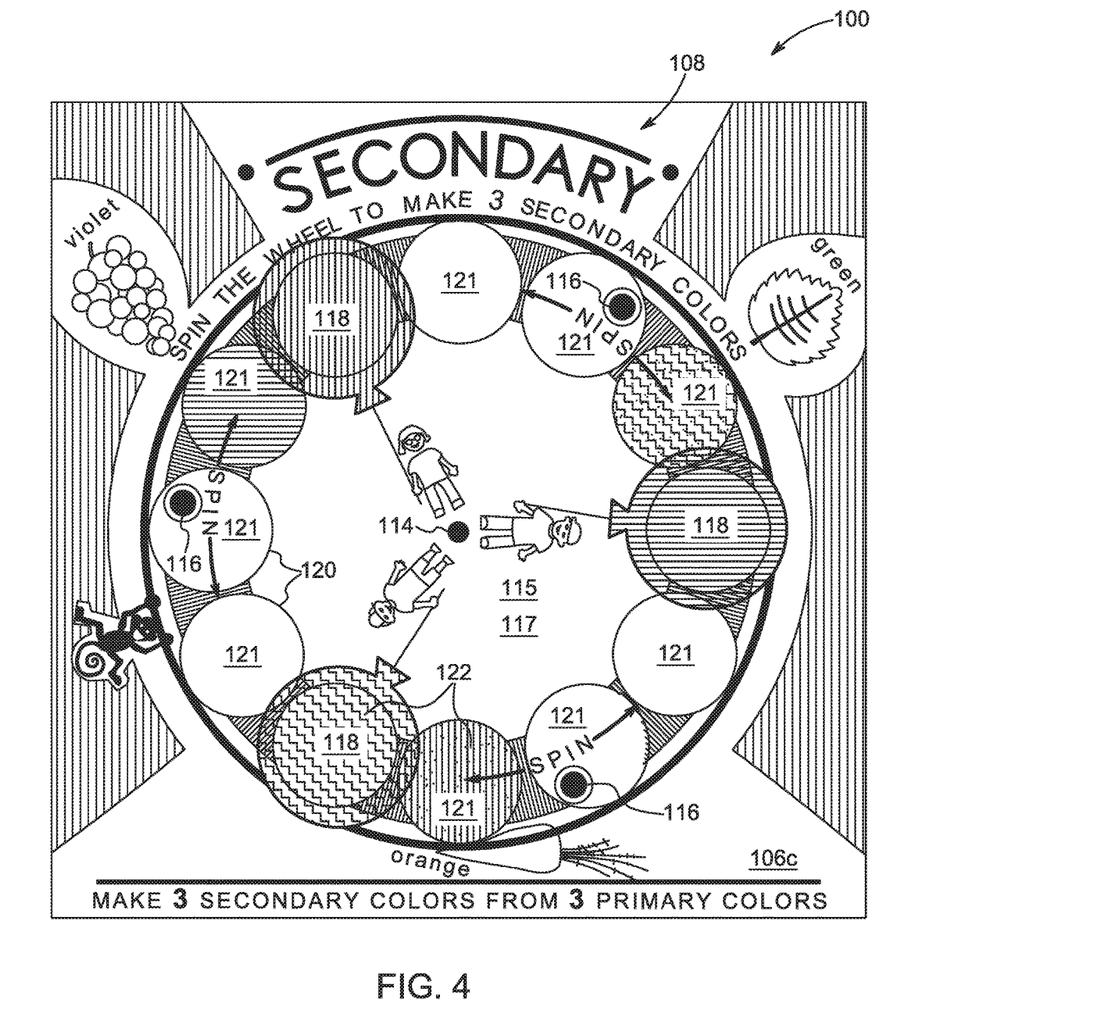
FIG. 4 is a perspective view of the educational tool shown in FIG. 1 depicting primary color indicia on a rotating member and primary color indicia on a page where the rotating colors form secondary colors when aligned with the indicia on the page.

Referring then, to FIG. 4, an embodiment of page 106c of educational tool 100 is shown. In the present embodiment, page 106c comprises rotating member 115, shaft 114, rotating indicia 118, fixed set of indicia 121, and printed subject matter 108. Rotating member 115 further comprises a major face 117 and rotating indicia 118 at a plurality of radial positions 120 on major face 117 of rotating member 115 (discussed in further detail below). In the present example, rotating indicia 118 includes primary colors. In other embodiments, the rotating set of indicia may include secondary or tertiary colors. In still other embodiments (not shown) the rotating set of indicia may include letters, numbers, or other features in addition or alternatively to indicia, such as textures, smells, notes, sounds, or any other features having educational significance. In the present embodiment, rotating member 115 further comprises a plurality of peg 116 which a child can grasp to easily turn rotating member 115 about the axis of shaft 114. In alternative embodiments, the child may turn rotating member 115 without the assistance of peg 116 by simply pressing down on a selected area of rotating member 115 and moving in the desired direction about the axis of shaft 114.

As can be seen in FIG. 4, page 106c comprises printed subject matter 108 that reiterates and reinforces the primary color concepts as depicted on pages 106a and b and adds additional concepts related to color blending and secondary colors. Further, page 106c depicts corresponding fixed indicia 121 that is in a substantially similar wheel-like configuration as that shown in pages 106a and 106b. To provide educational and entertainment value, rotating member 115 is configured to selectively rotate about shaft 114 to a plurality of aligned positions 122 where rotating indicia 118 and fixed set of indicia 106 align. In the present embodiment, fixed indicia and rotating indicia are in a similar configuration as center indicia 110 and outer indicia 112 and colored outer indicia 111 to reinforce the lesson and educational significance for better retention. In the embodiment illustrated by FIG. 4, then, fixed indicia 121 comprises a plurality of round colorless circles and three colored circles, each representing one of the three primary colors. Printed subject matter 108 comprises identification of a secondary color and an object that represents that secondary color. By way of example, FIG. 4 depicts printed subject matter 108 as comprising the color green with a leaf, the color purple with grapes, and the color orange with a carrot. Finally, FIG. 4 shows the number of peg 116 to be three, however, it should be understood that more or less of peg 116 may be used in order to effectuate turning rotating member 115.

In the embodiment according to FIG. 4, fixed indicia 121 and rotating indicia 118 each comprise primary colors. By way of example, fixed indicia 121 comprises a blue circle, a yellow circle, and a red circle. Similarly, rotating indicia 118 comprises a red balloon, a yellow balloon, and a blue balloon. In the present embodiment, rotating indicia 118 is substantially transparent and includes three primary color transparent indicia, the first of said primary color transparent indicia comprising a transparent red balloon, the second of said primary color transparent indicium comprising a transparent yellow balloon and the third of said primary color transparent indicia comprising a transparent blue balloon. In this manner, when rotating member 115 is turned and fixed indicia 121 and rotating indicia 118 are in the aligned position 122, they will blend to create a secondary color. For example, when the red balloon is placed over the yellow circle in the aligned position, the resultant color will be orange. For example, when the blue balloon is placed over the red circle in the aligned position, the resultant color will be purple. When the yellow balloon is placed over the blue circle in the aligned position, the resultant color will be green and so forth. In alternative embodiments, rotating indicia 118 and fixed indicia 121 are not in aligned position 122 and no secondary color is formed. In this manner, the child is able to recognize when a primary color remains a primary color and when it is blended with another primary color and becomes a secondary color, thus reinforcing the educational significance of the lesson. Thus, to engage in the lesson contained in page 106a and b, the child may rotate rotating indicia 118 about the wheel and engage in the color blending activities effectuated by rotating member 115, rotating indicia 118, and fixed indicia 121.

It should be understood that the order in which each of the primary colors, whether fixed or rotating, appears on the page is not important so long as all three primary colors are included. What is important is that there appears a transparent representation of each of the three primary colors and a solid appearance of each of the three primary colors to reinforce the lesson of using primary color combinations to create secondary colors and build on the color lessons in the previous pages. It should further be understood that is an object of the present invention that rotating indicia 118 and fixed indicia 121 comprise each of the three primary colors and that the actual shape and representation of center indicia 110 is not important. That is, rotating indicia 118 and fixed indicia 121 may comprise any shape or configuration so long as each of the three primary colors is represented on each. It should be understood that FIG. 4 depicts rotating indicia 118 and fixed indicia 121 in a particular configuration and arrangement by way of example only. Further, printed subject matter 108 may be located anywhere on third page 106c and in any configuration sufficient to act as a contrast and impart the lesson of the uniqueness of primary colors.

Alternative Embodiment of the Educational Tool.

With attention to FIG. 5, a second example of an educational tool, educational tool 200, will now be described. Educational tool 200 includes many similar or identical features to educational tool 100. Thus, for the sake of brevity, each feature of educational tool 200 will not be redundantly explained. Rather, key distinctions between educational tool 200 and educational tool 100 will be described in detail and the reader should reference the discussion above for features substantially similar between the two educational tools. FIG. 5 illustrates an embodiment of educational tool 200 as identified in page 106d. In the present embodiment, educational tool 200 comprises a plurality of pivoting member 215 and an equal number of pin 210, fixed indicia 221, and printed subject matter 108.

As can be seen in FIG. 5, page 106d comprises printed subject matter 108 that reiterates and reinforces the primary color concepts as depicted on pages 106a, b, and c and adds additional concepts related to color blending and tertiary colors By way of example, in the present embodiment, fixed indicia 221 comprises a blue balloon, a yellow balloon, and a red balloon. Similarly, pivoting member 215 comprises a red balloon, a yellow balloon, and a blue balloon. In the present embodiment, the lesson relates to secondary colors.

In some embodiments, pivoting member 215 may further comprise pivoting indicia to further reinforce the lesson. In the present embodiment, pivoting member 215 affixed to page 106d by pin 210 as shown. In this manner, a child may move pivoting member 215 about the center axis of pin 210. Further, in a preferred embodiment and similar to rotating member 115, pivoting member 215 is substantially transparent and comprises each of the three primary colors. In the present embodiment, pivoting member 215 includes the first of said primary color transparent indicia comprising a transparent red balloon, the second of said primary color transparent indicium comprising a transparent yellow balloon and the third of said primary color transparent indicia comprising a transparent blue balloon.

In the present embodiment, to provide educational and entertainment value, pivoting member 215 is configured to selectively pivot about pin 210 to a plurality of aligned positions 222 where pivoting member 215 and fixed indicia 221 align. In the present embodiment, fixed indicia 221 and pivoting member 215 are in a similar configuration as center indicia 110, outer indicia 112, and colored outer indicia 111 to reinforce the lesson and educational significance for better retention. Thus, when pivoting member 215 and fixed indicia 221 are in aligned position 222, a secondary color is created. For example, when the red pivoting indicia is placed over the yellow fixed indicia, the resultant color will be orange. When the yellow pivoting indicia is placed over the blue fixed indicia, the resultant color will be green. When the blue pivoting indicia is placed over the red fixed indicia, the resultant color will be violet. In alternative embodiments, pivoting member 215 and fixed indicia 221 are not in aligned position 222. In this manner, the child is able to recognize when a primary color remains a primary color and when it is blended with another primary color and becomes a secondary color, thus reinforcing the educational significance of the lesson. To reinforce the educational significance of the lesson, printed subject matter 108 in the present embodiment may include a common object that is a secondary. By way of example, when aligned position 222 results in the color violet, printed subject matter 108 will depict a child wearing a purple shirt featuring grapes. Similarly, when aligned position 222 results in the color orange, printed subject matter 108 will depict a second child wearing an orange shirt featuring the citrus fruit of the same name. Finally, when aligned position 222 results in the color green, printed subject matter 108 will depict a third child wearing a green shirt featuring a leaf.

It should be understood that the order in which each of the primary colors, whether fixed or pivoting, appears on the page is not important so long as all three primary colors are included. What is important is that there appears a transparent representation of each of the three primary colors and a solid appearance of each of the three primary colors to reinforce the lesson of using color combinations to create other colors and build on the color lessons in the previous pages. It should also be understood that is an object of the present invention that center fixed indicia 221 and pivoting member 215 comprise each of the three primary colors and that the actual shape and representation of fixed indicia 221 is not important. Further, fixed indicia 221 and/or pivoting member 215 are not required to be in the shape of a balloon; they may comprise any shape or configuration so long as they represent each of the three primary colors.

FIG. 5 depicts fixed indicia 221 and pivoting member 215 in a particular configuration and arrangement by way of example only. Similarly, printed subject matter 108 may be located anywhere on page 106*d* and in any configuration sufficient to act as a contrast and impart the lesson of the uniqueness of primary colors. Finally, it is an object of the present invention that educational tool 100 and educational tool 200 may be included in the same book. It is further an object of the invention that educational tool 100 and educational tool 200 may work alone or in concert to provide and educational and entertaining lesson in color for a child.

Figure 6:
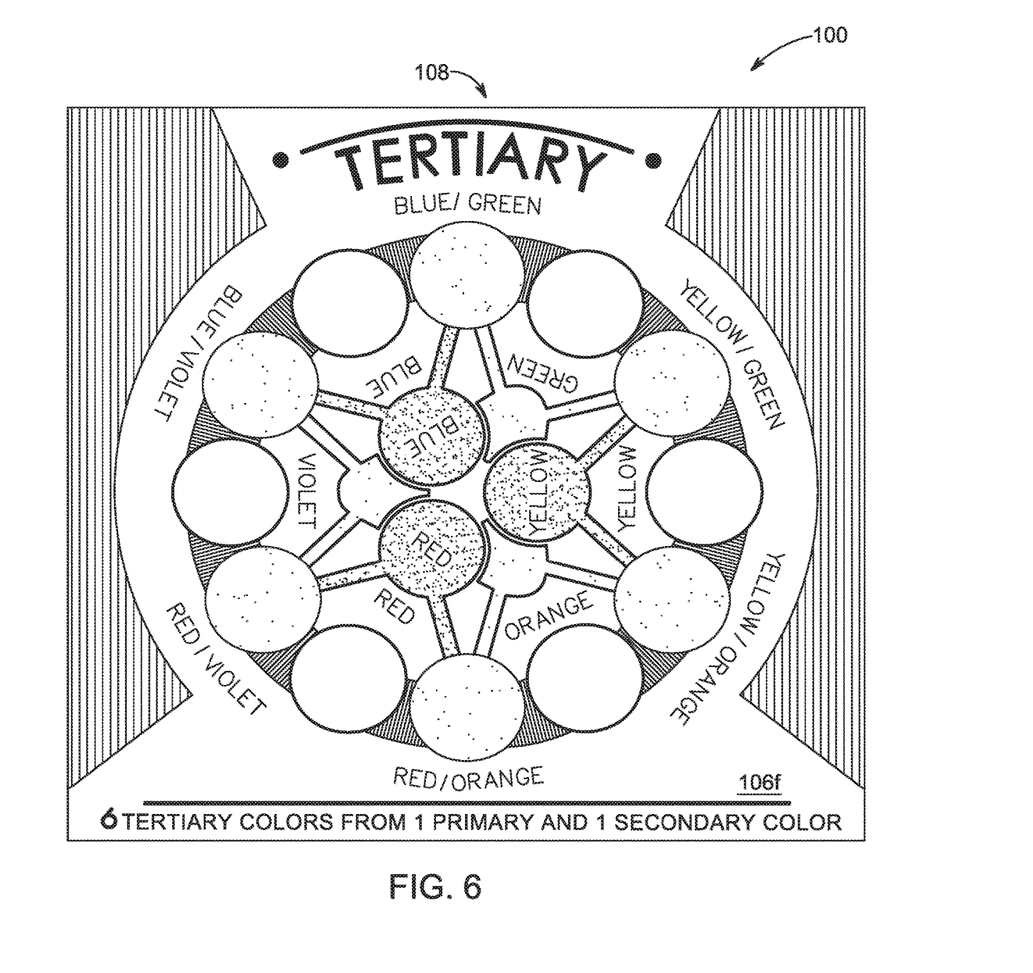
FIG. 6 is a perspective view of the educational tool shown in FIG. 1 depicting primary, secondary, and tertiary color indicia on a page.
Figure 7:
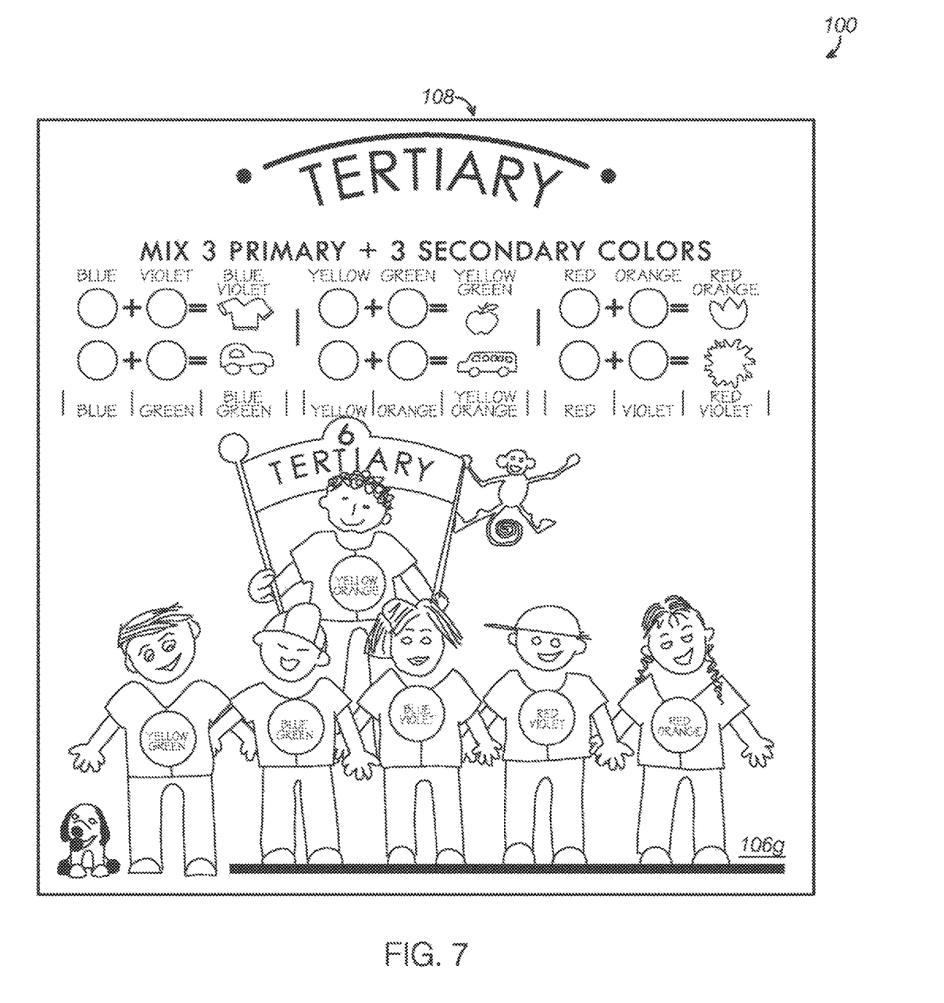
FIG. 7 is a perspective view of the educational tool shown in FIG. 1 with alternative representation of primary, secondary, and tertiary color indicia on a page.
Figure 8:
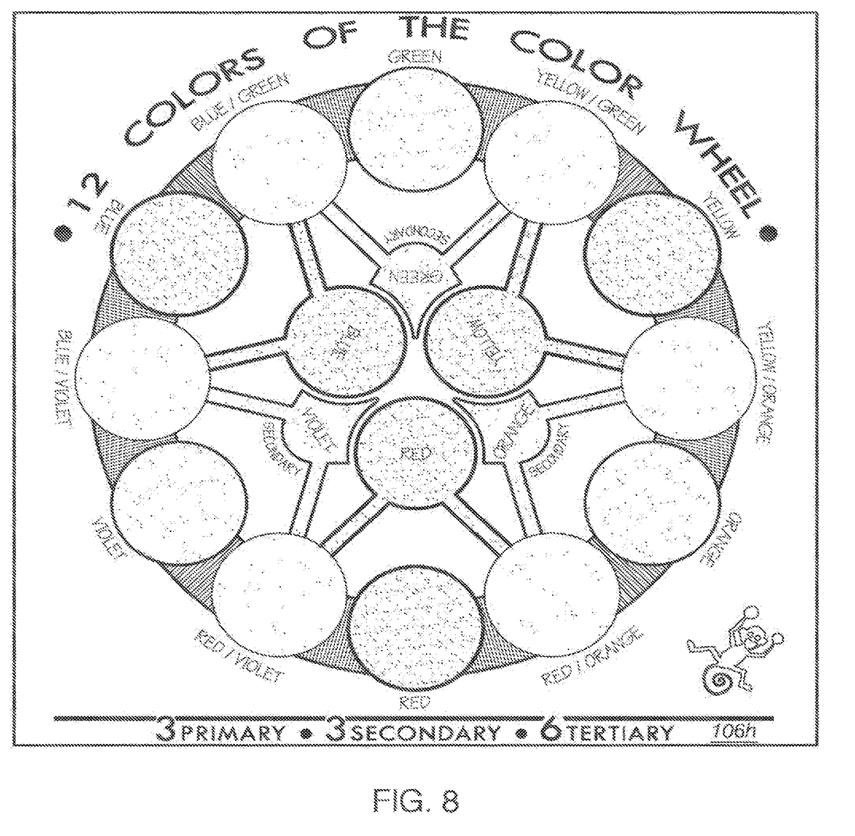
FIG. 8 is a perspective view of the educational tool shown in FIG. 1 with alternative representation of primary, secondary, and tertiary color indicia on a page.

Referring now to FIGS. 6-8, a lesson in tertiary colors is provided. FIGS. 6-8 include many similar or identical features to educational tool 100 and educational tool 200. Thus, for the sake of brevity, each feature of the tools will not be redundantly explained. Rather, key distinctions between the relevant elements will be described in detail and the reader should reference the discussion above for features substantially similar between the two educational tools.

Referring now to FIGS. 6 and 7, pages 106*f* and *g* are shown. As can be seen, pages 106*f* and *g* comprise printed subject matter 108 that reiterates and reinforces the primary and secondary color concepts as depicted in the preceding pages. Thus pages 106*f* and *g* depict round indicia comprising the colors blue, red, yellow, green, purple, and orange surrounded by the colors teal, chartreuse, vermillion, magenta, and violet. It should be understood that the order in which each of the colors (whether fixed, rotating, or pivoting) appears on the page is not important so long as the necessary colors are included. What is important is that there appears a representation of each of the three primary colors, each of the three secondary colors, and each of the six tertiary colors. In this manner, printed subject matter 108 operates to reinforce the lesson of using primary color combinations to create secondary colors and secondary color combinations to create tertiary colors, thus building on the color lessons in the previous pages. In the present embodiment, the configuration of printed subject matter 108 is similar to the configuration sin the preceding pages to reinforce the lesson and educational significance for better retention.

As mentioned above, front cove 102 may be configured as page 106*e* (not shown) to further reinforce the educational significance of the preceding color lessons. In alternative embodiments (not shown) tertiary colors may be taught via the pivoting member as described in FIG. 5 and educational tool 200. In still other embodiments (not shown) tertiary colors may be taught via rotating and fixed indicia in a manner similar to the manner described in FIG. 4. That is, a child may blend an opaque or transparent secondary color indicia with an opaque or transparent primary color indicia to create tertiary colors.

Figure 9:
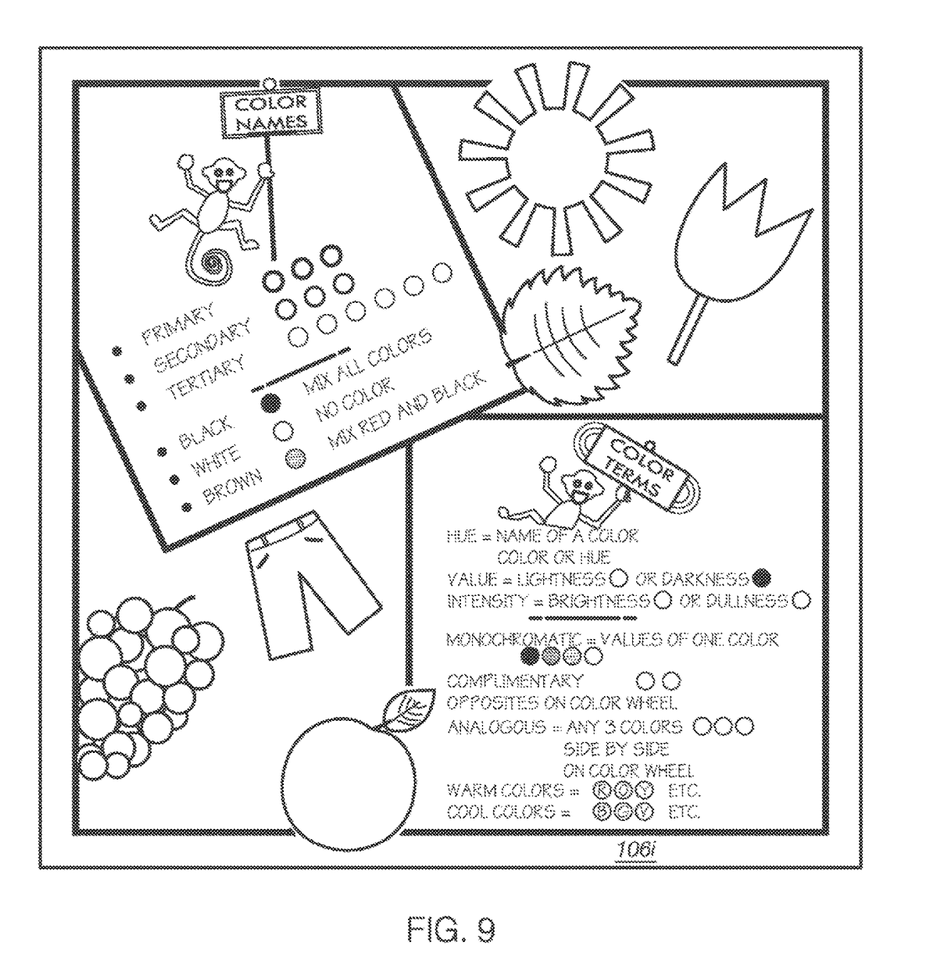
FIG. 9 is a perspective view of the educational tool shown in FIG. 1 with alternative representation of primary, secondary, and tertiary color indicia on the pages.

Referring now to FIGS. 8 and 9, a summary of the lessons learned in educational tool 100 and educational tool 200 is provided. FIGS. 8 and 9 comprise pages 106*h* and *i*, respectively, each of which further comprises printed subject matter 108 that summarizes and repeats key points of each lesson taught as well as instructs the child further in the uniqueness of different color combinations and attributes of different types of color. In this manner, the educational significance of the entire color lesson is reinforced for maximum retention.

Figure 10:
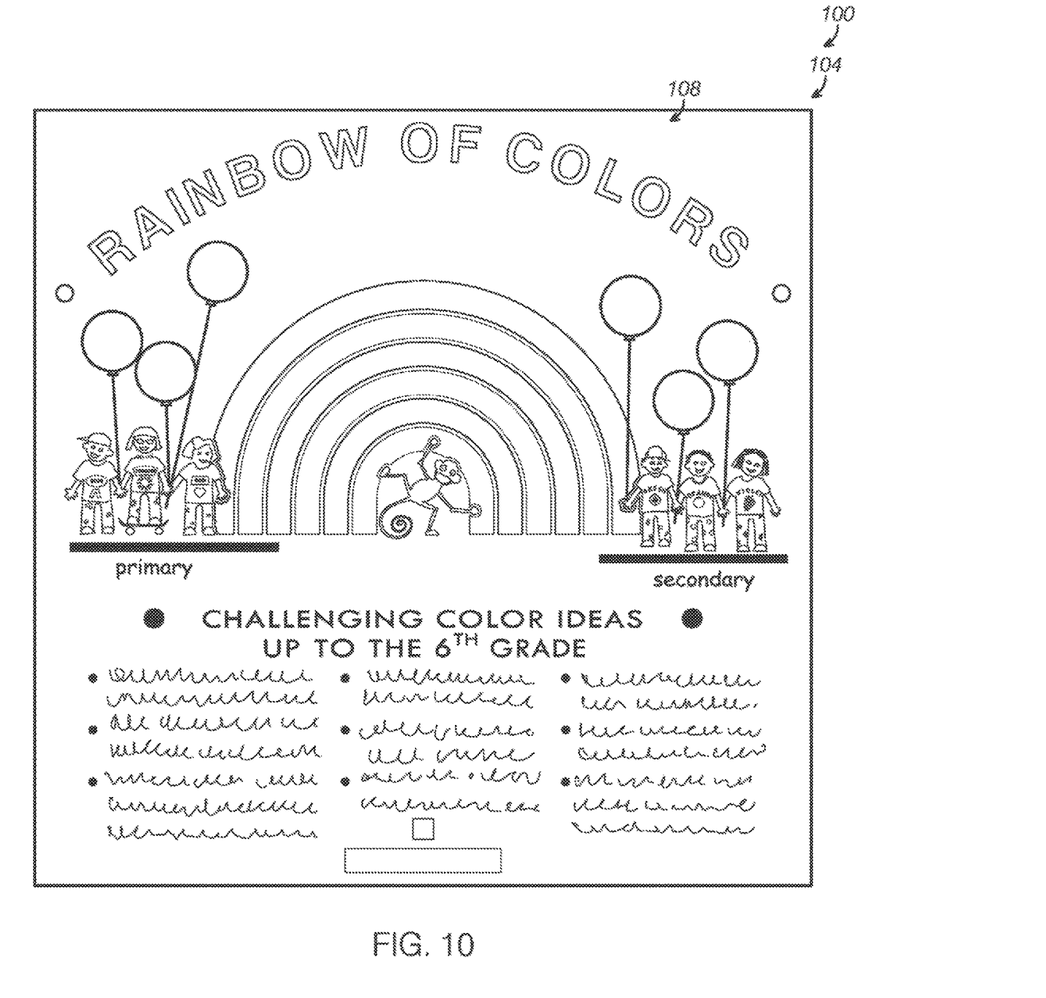
FIG. 10 is a perspective view of the rear cover of an example of an educational tool focused on colors and color combinations.

Referring finally to FIG. 10, an embodiment of rear cover 104 is shown. Rear cover 104 functions to support the other components of educational tool 100 and educational tool 200. In the example shown in FIG. 1, rear cover 104 includes printed subject matter 108, which in the present figure comprises indicia that summarizes the subject matter of educational tool 100 and educational tool 200 and provides information about the author, publisher, the book's intended audience and purpose, and other relevant information.

In the present example, rear cover 104 is formed from card stock paper, but any currently known or later developed substrate suitable for selectively adopting different configurations and for supporting components of the educational tool may be used. In a particular example, the cover is formed from heavy card stock with sufficient rigidity to enable the cover to stand upright. The cover may also be formed from plastic, metal, and composite materials to suit different applications and purposes.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An interactive and educational tool, comprising:
   a cover including;
   an interactive section having a substantially planar face and a fixed set of indicia disposed on the face;
   a shaft mounted to the interactive section perpendicular to the face of the interactive section;
   a rotating member rotationally mounted to the shaft, the rotating member having a rotating set of indicia at a plurality of radial positions on a face of the rotating member; wherein:
   the rotating member is configured to selectively rotate about the shaft to a plurality of aligned positions where the rotating set of indicia and the fixed set of indicia align; and
   the rotating set of indicia and the fixed set of indicia are selected to align in selected combinations.

2. The interactive and educational tool of claim 1, wherein the rotating set of indicia includes primary colored indicia and non-colored indicia.

3. The interactive and educational tool of claim 1, wherein the fixed set of indicia includes primary colored indicia and non-colored indicia.

4. The interactive and educational tool of claim 1, wherein the rotating set of indicia includes three primary color transparent indicia, the first of said primary color transparent indicia comprising a transparent red indicium, the second of said primary color transparent indicium comprising a transparent yellow indicium and the third of said primary color transparent indicia comprising a transparent blue indicium.

5. The interactive and educational tool of claim 1, wherein the fixed set of indicia includes three primary color solid indicia, the first of said primary color solid indicia further comprising a solid red indicium, the second of said primary color solid indicia further comprising a solid blue indicium, and the third of said primary color solid portions further comprising a solid yellow indicium.

6. The interactive and educational tool of claim 5, wherein the rotating set of indicia and the fixed set of indicia collectively form secondary colors when aligned in combinations other than the selected combinations.

7. The interactive and educational tool of claim 1, wherein the rotating set of indicia and the fixed set of indicia form secondary colors when aligned in the selected combinations.

8. The interactive and educational tool of claim 1, wherein the rotating set of indicia and the fixed set of indicia do not form secondary colors when aligned in combinations other than the selected combinations.

9. The interactive and educational tool of claim 1, wherein the interactive section includes printed subject matter selected for the rotating set of indicia and the fixed set of indicia when aligned in the selected combinations.

10. The interactive and educational tool of claim 1 wherein the rotating set of indicia and the fixed set of indicia are circular.

11. The interactive and educational tool of claim 1, wherein:
    the rotating member and the interactive section have substantially the same dimensions; and
    the rotating member is configured to pivot to a position overlying the interactive section.

12. An interactive and educational tool, comprising:
    an interactive section having a substantially planar face and a fixed set of indicia disposed on the face and a pivoting set of indicia comprised of pivoting members and disposed on the face;
    a set of shafts mounted to the interactive section perpendicular to the face of the interactive section;
    wherein a pivoting member is rotationally mounted to one of said set of shafts, the pivoting member being substantially transparent;
    wherein each pivoting member is configured to selectively rotate about the shaft to a position where the pivoting set of indicia and the fixed set of indicia align; and
    wherein the pivoting set of indicia and the fixed set of indicia are selected to align in selected combinations.

13. The interactive and educational tool of claim 12 wherein the fixed set of indicia further comprises a first marker, a second marker, and a third marker.

14. The interactive and educational tool of claim 13, wherein the first pivoting member comprises the color blue, the second pivoting member comprises the color yellow, and the third pivoting member comprises the color red.

15. The interactive and educational tool of claim 13, wherein the first marker comprises the color yellow, the second marker comprises the color red, and the third marker comprises the color blue.

16. The interactive and educational tool of claim 12 wherein the pivoting members of said pivoting set of indicia further comprise:
    a first pivoting member a corresponding with a first marker on the face of the interactive section;
    a second pivoting member adjacent to the first pivoting member and corresponding with a second marker on the face of the interactive section; and
    a third pivoting member adjacent to the second pivoting member and corresponding with a third marker on the face of the interactive section.

17. The interactive and educational tool of claim 16, wherein the fixed set of indicia and the pivoting set of indicia collectively form primary colors when aligned in combinations other than the selected combinations.

18. The interactive and educational tool of claim 12, wherein:
    the pivoting members and the fixed set of indicia have substantially the same dimensions; and
    the pivoting members are configured to pivot to a position overlying the fixed set of indicia.

19. An interactive and educational tool, comprising:
    a folding cover having an interactive section with a substantially planar face;
    a shaft mounted to the interactive section perpendicular to the face of the interactive section;
    a rotating member rotationally mounted to the shaft at a first position on the shaft, the rotating member having a first set of colors at a plurality of radial positions on a major face of the rotating member;
    wherein:
    the interactive section includes a fixed set of colors on the face of the interactive section disposed proximate and around the first rotating member;
    the rotating member is configured to selectively and cooperatively rotate about the shaft to a plurality of aligned positions where the first set of colors and the fixed set of colors align; and the first set of colors and the fixed set of colors are selected to form secondary colors when aligned in selected combinations.

20. The interactive and educational tool of claim 19, wherein the first set of colors and the fixed set of colors collectively form primary colors when aligned in combinations other than the selected combinations.

\* \* \* \* \*